United States Patent [19]

Phillips

[11] Patent Number: 4,512,567
[45] Date of Patent: Apr. 23, 1985

[54] EXERCISE BICYCLE APPARATUS PARTICULARLY ADAPTED FOR CONTROLLING VIDEO GAMES

[76] Inventor: Robert V. Phillips, 113 High St., South Bound Brook, N.J. 08880

[21] Appl. No.: 479,511

[22] Filed: Mar. 28, 1983

[51] Int. Cl.³ .............................................. A63B 69/16
[52] U.S. Cl. ............................... 272/73; 273/DIG. 28
[58] Field of Search ................... 272/73; 273/DIG. 28

[56] References Cited

U.S. PATENT DOCUMENTS

| | | | |
|---|---|---|---|
| 4,278,095 | 7/1981 | Lapeyre | 273/DIG. 28 |
| 4,298,893 | 11/1981 | Holmes | 273/DIG. 28 |
| 4,382,166 | 5/1983 | Kim | 273/DIG. 28 |

FOREIGN PATENT DOCUMENTS 2822343  11/1979  Fed. Rep. of Germany ........ 272/73

*Primary Examiner*—Richard C. Pinkham
*Assistant Examiner*—Leo P. Picard
*Attorney, Agent, or Firm*—Arthur L. Plevy

[57] ABSTRACT

An exercise bicycle is associated with controllable apparatus such as potentiometers which provide an electrical signal based on the motion of the handlebars as well as signals proportional to the speed at which the bicycle is being operated at. These signals are interfaced with a typical microcomputer or video game machine which can utilize these signals to control the motions necessary to operate a video game. In this manner the apparatus generates five separate control signals one of which is indicative of the speed that the bicycle is being pedaled, the left to right movement of the handlebars as well as the forward to backward or up and down movement of the handlebars. There are associated with the handlebars two separate switches which can further be activated by the operator. In this manner the exercise bicycle is used to control and fully operate the video game thereby allowing a user to receive healthful exercise while participating in the skills necessary to play the video game.

9 Claims, 8 Drawing Figures

EXERCISE BICYCLE APPARATUS PARTICULARLY ADAPTED FOR CONTROLLING VIDEO GAMES

BACKGROUND OF THE INVENTION

This invention relates to an exercise device in general and more particularly to an exercise bicycle including apparatus in conjunction with the bicycle for controlling a video game.

As one can ascertain, video games have become extremely popular and are played by many people, particularly those in their teenage years.

Based on the above considerations, many people have serious complaints about the effect of video games on the general health of the children regarding the lack of physical exercise that one accomplishes in spending many hours in playing such games. It is basically an object of the present invention to devise an exercise bicycle which has apparatus incorporated therein to enable one to fully control and play any type of video game while performing worthwhile exercise.

The concept of exercising while watching television or engaging in some other activity is discerned in the patent art and various devices exist which include combinations of exercise with some visual or peripheral activity.

For example, U.S. Pat. No. 3,984,666 entitled CALORIE METERING EXERCISER by B. Barron, issued on Oct. 5, 1976. This patent shows a bicycle which is combined with an electronic circuit which converts the output energy from the bicycle into calories. In this manner, the user of the bicycle can determine how much energy he expended during exercising. This patent, of course, is not pertinent to exercise and pleasure activities but is generally related to the field of invention.

U.S. Pat. No. 4,060,239 entitled ERGOMETER WITH AUTOMATIC LOAD CONTROL SYSTEM issued on Nov. 29, 1977 to W. Pfleiderer, et al. This patent also shows a device for measuring energy in regard to the amount of work expended by a user in operating an exercise bicycle. Other patents as U.S. Pat. No. 4,141,630 entitled BICYCLE by C. H. Emmons, issued on Feb. 27, 1979 show a bicycle which operates a motion picture projector. The purpose of the apparatus is to allow the user to view a scene as he is exercising where the passing of the scene will vary according to the speed of the bicycle which is analogous to riding outdoors.

U.S. Pat. No. 4,298,893 entitled TV ENERGIZED BY EXERCISE BICYCLE issued to J. H. Holmes on Nov. 3, 1981, also shows an exercise bicycle which operates a generator which charges a battery to supply power to a television. Hence in order to watch television, one must operate the generator by means of the bicycle, and if one does not do so, one will not be able to view the television.

There are many other patents which relate to a combination of exercise with some peripheral equipment which is operated directly by the exercise equipment to generate some type of display.

In any event, the present apparatus concerns an exercise bicycle which includes unique controls incorporated on the bicycle to enable a user to control a video game according to his dexterity and based on operating the bicycle according to the characteristics of the game he is participating in.

BRIEF DESCRIPTION OF THE PREFERRED EMBODIMENT

An exercising apparatus controlling a video game, said game of the type having input terminals for receiving electrical type signals necessary to control the movement of a particular object associated with said video game as displayed on the screen of a television receiver associated with said game, comprising in combination therewith an exercise bicycle having a driven wheel and a movable handlebar assembly means coupled to said driven wheel to provide an output proportional to the speed of said wheel, means coupled to said handlebar assembly to provide an output proportional to the movement of said assembly in a particular plane and interface means responsive to said outputs for coupling the same to said input terminals of said video game.

DETAILED DESCRIPTION OF THE FIGURES

Figure 1:
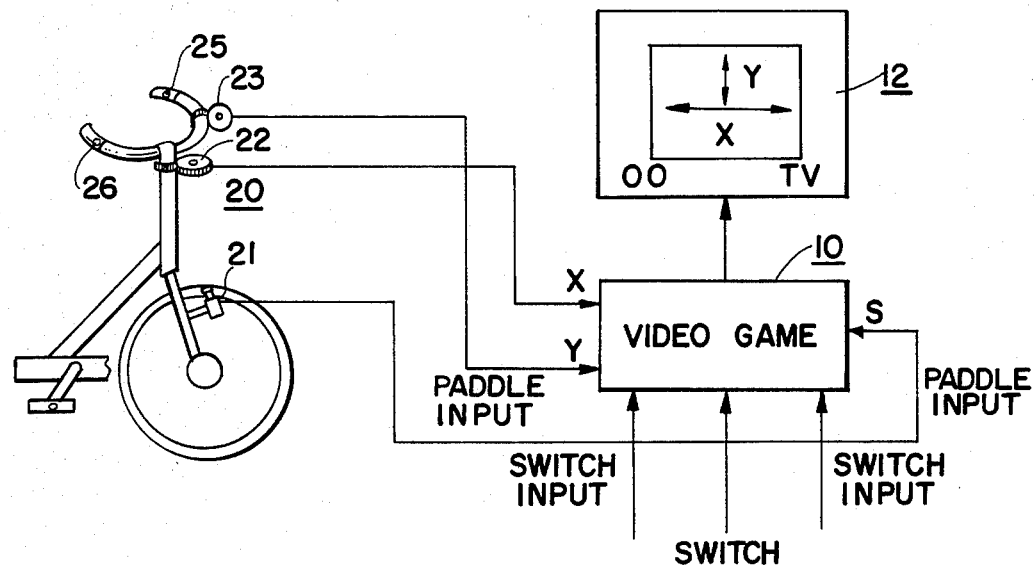
FIG. 1 is a simplified block diagram of the exercise apparatus employed with a video game.

Referring to FIG. 1, there is shown a general block diagram of the apparatus according to this invention. As is well known, video games are available from any sources. A particular popular type of game is manufactured by the Atari Company, and essentially, the video game 10 is a specialized type of computer which is coupled to the antenna input of a conventional television receiver 12. The video game 10 is adapted to receive a video cartridge, which cartridge contains program instructions and which program generates a display on the screen of the video receiver enabling the user to participate in various games.

A typical video game apparatus which is widely available in today's market is designated as the Atari 400 or the Atari 800. There ar many other manufacturers of such games as well. Essentially, all of the games operate together with a module as 10 which as indicated above is a specialized computer. As such, the module 10 contains various inputs which are designated at "paddle" inputs and also contains switch inputs. The inputs are a series of jacks which appear on the housing containing the computer. These inputs enable one to couple various controls to the same such as joy stick controls or various other types of mechanical controls to enable a user to move a joy stick or the control so that he can manipulate various characters associated with the game in both the horizontal and vertical direction as the X and Y planes.

This aspect of video games is well known in the art and all such games operate in the same exact manner. What is meant by this is that by utilizing a proper moveable device, one can control the motion of a character in the X and Y planes as well as control various other devices such as electrical guns and so on which can be carried by an object such as an airplane or spaceship which is shown on the screen. Essentially, the paddle inputs as well as the switch inputs are designed to receive a variable resistance or a ground or open circuit to indicate to the computer what operation the user desires.

For example, to move the object in the X direction, one may move a joy stick control to the left or right in the horizontal plane and the character of object will move proportionately. In a similar manner one may move the character in the vertical plane or Y plane by moving the joy stick or control in the same direction. If the object contains another device such as a gun to eliminate targets, the is a button that the user presses to energize the gun. This button normally provides a closure in the form of a ground to the computer at the switch input which tells the computer that the user wishes to fire the gun.

Shown in FIG. 1, is an exercise bicycle 20. The bicycle 20 is a stationary type of exercise bicycle which has been adapted according to this invention to control a video computer 10 of the above described type. As will be explained, the bicycle contains a generator 21 which is an ordinary electrical generator commonly available and utilized, for example, to power lights and other devices incorporated in bicycles. The generator 21 produces a series of output pulses which are proportional to the speed at which the bicycle wheel is rotating which, of course, is proportional to the amount of energy expanded by the user in pedaling. These pulses as will be explained which emanate from generator 21 are integrated to produce a DC voltage which varies according to speed. This DC voltage is applied to one paddle input of the computer to control the speed of movement of the character.

A second control 22 is a potentiometer or variable resistance device. This device is operated by the user in turning the handlebars to the left or right. The output of the potentiometer 22 is coupled to a paddle input as an X input of the computer, and therefore the user can move the character to the left or right according to the motion of the handlebars as translated by the potentiometer into an electrical signal.

A further potentiometer 23 is also positioned on the handlebars and is directed to another paddle input. The user of an exercise bicycle can move the handlebars up and down or in the X or Y direction, and hence the electrical signals generated by the potentiometer can operate the display and hence move the character in the Y direction.

Also included on the handlebars of the bicycle are a left and right button or switch 25 and 26. These switches are also coupled to the switch inputs associated with the computer and enable the computer to receive a command to activate an electrical gun or other assembly according to the program when the user depresses the buttons.

While the above described potentiometer, buttons, and generator have been indicated above to control particular aspects of a display such as the speed of the display as well as the X and Y directions, it will be understood at the onset that the outputs of such devices could be directed to any of the different paddle or switch inputs associated with any of the various types of computers presently being sold and marketed.

As eluded to above, the video game apparatus 10 operates to produce a display and characters according to the type of program contained on the particular cartridge utilized. Based on this program, the variation of resistance on a paddle input will produce a given motion or movement of the character on the display. In regard to such programs, the switch inputs will also produce a different response according to the program as for example firing a gun or releasing a bomb or other similar type of thing.

Therefore, the exercise bicycle as described above, together with the corresponding apparatus can fully operate with any type of video game 10 and produces the desired responses by means of the apparatus contained and included in the bicycle. The apparatus is manipulated and controlled by the user moving the handlebars as by turning or by increasing or decreasing the pedaling speed to gain the ability to fully participate in the game while at the sametime exercising and increasing his reflex skills in attempting to coordinate his body motions to perform the objectives of the game in the desired manner.

Figure 2:
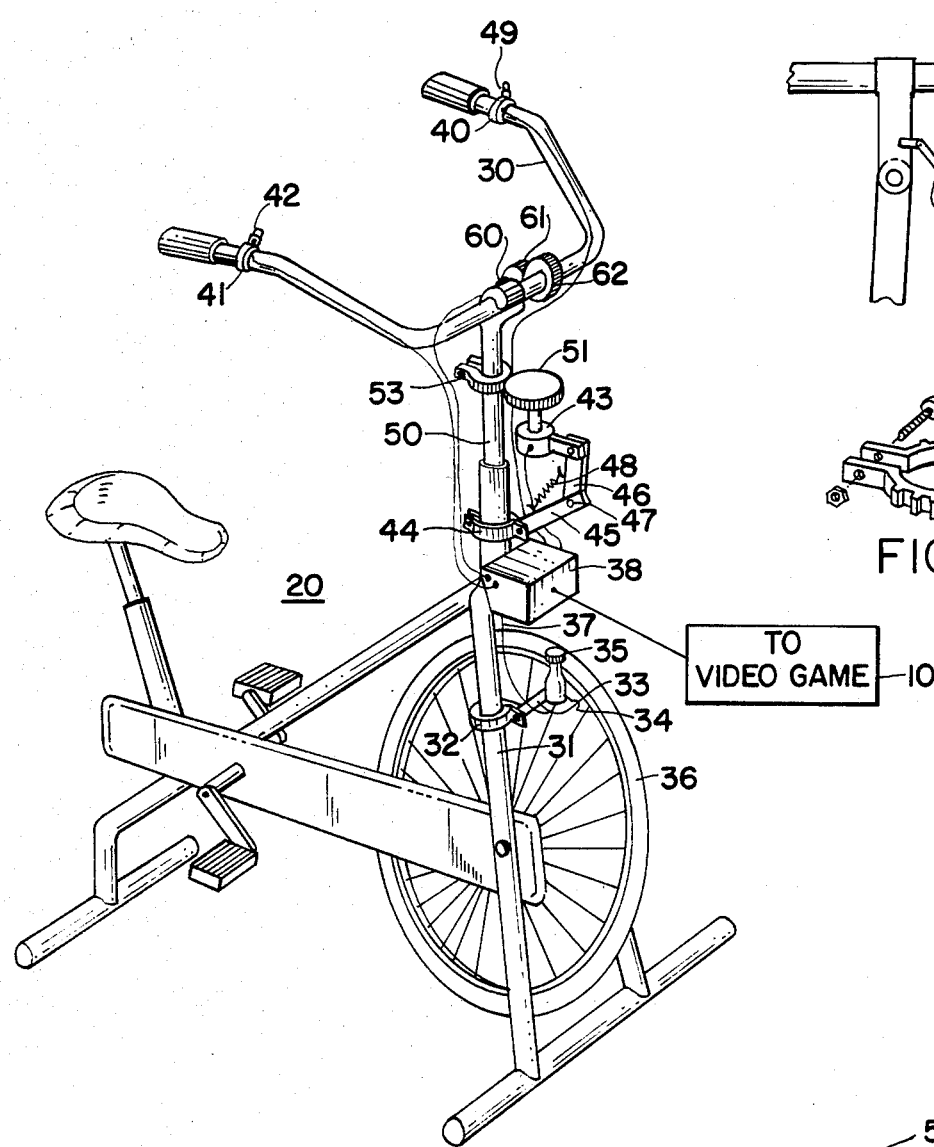
FIG. 2 is a detailed mechanical perspective view of the exercise apparatus as shown in FIG. 1.

Referring to FIG. 2, there is shown a mechanical assembly drawing of an exercise bicycle adapted with controls to enable interface and control of a video game such as game 10. Essentially, exercise bicycles are well known and many examples exist in the prior art. There are many models available, but all of them function in relatively the same manner. The exercise bicycle 20 is stationary and contains a pair of pedals to enable a user, when seated on the apparatus, to exercise as in a conventional bicycle.

The handlebars 30 of the bicycle are moveable to the left or right or can be tilted to move up or down. This operation can be easily implemented on a conventional exercise bicycle. Shown coupled to the fork 31 of the bicycle is a clamp 32 which is secured to a rod 33 which rod is coupled to an electrical generator 34. The generator 34 as indicated is a well known and commercially available device. Essentially, the generator has a rotatable circular gear 35 which is coupled to a shaft. The gear 35 rests against the sidewall of the bicycle wheel 36 and is rotated in proportion to the rotation of the wheel 36. As is well known, the generator produces a series of pulses which are a function of the speed that the wheel is being operated at. The output of the generator is directed by means of a cable 37 to an interface box or housing 38 located on the frame of the bicycle and which as will be explained contains the necessary wired cables and circuitry to enable interfacing of the exercise bicycle to the video game 10.

Secured to the handlebars at the left and right sides by means of conventional clips 40 and 41 are two momentarily operated push buttons 42 and 43. Each button is secured to the handlebars by means of the associated clamp and operates to produce either a closed or open circuit when depressed by a user. The two wires emanating from each button are also directed to the interface box 38.

As indicated above for FIG. 1, various video game devices utilize such button apparatus to indicate an appropriate action according to the program of the particular game being displayed on the televison receiver.

The exercise bicycle is also associated with two potentiometers. A first potentiometer 43 is secured by means of a clamp 44 to the stem of the bicycle which clamp is associated with a first bracket 45 and a second upstanding bracket 46 which bracket is coupled to the potentiometer 43. The brackets 45 and 46 are pivotally coupled to each other through a screw member 47. The two brackets are spring biased by means of spring 48 so that the position of the potentiometer can be adjusted with respect to the step 50 of the bicycle. The shaft of potentiometer 43 is coupled to a knob 51 having gear-like serrations in the outer periphery as can further be evidenced by the top plan view shown in FIG. 3.

Figure 4:
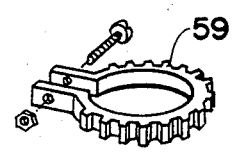
FIG. 4 is a top plan view of a control bracket or gear strip utilized in this invention.

Hence as member 51 is rotated, the potentiometer will vary in resistance as is well known. The output terminals of the potentiometer are coupled via a cable 52 to the interface box 38. Located on stem 50 of the bicycle is a corresponding gear member 53. Member 53 essentially has a gear to the configuration which corresponds to the gear configuration of the knob 51. A top plan view of member 53 is shown in FIG. 4.

As one can ascertain, as the handlebars of the bicycle are rotated or turned to the left or right, member 53 will vary potentiometer 43 via the gear 51, and hence the potentiometer will provide a resistance equivalent to the amount or degree of the turn. It is, of course, understood that the amount of resistance or change afforded by the potentiometer can be accurately controlled by including suitable mechanical stops which will prevent the user from moving the handlebars or turning the handlebars outside a desired range. Stop mechanisms to limit motion are well known in the art, and, for example, one could provide a rod or lever which is secured to the frame and which will coact with the handlebars to limit motion. Also included on the handlebars assembly is another potentiometer 60 which is associated with a knob 61 having a gear to the arrangement such as knob 51.

Figure 5:
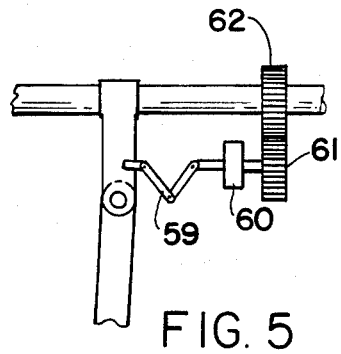
FIG. 5 is a partial plan view depicting a control potentiometer.

The potentiometer as seen in FIG. 5, is coupled to the stem by means of a suitable spring biased bracket as 62, in order for it to coact with a driving mechanism such as the gear strip 62 which is similar in construction to the gear strip 53.

As can be seen from FIG. 2, as the user tilts the handlebars upwards or downwards, the magnitude of potentiometer 60 varies accordingly. The output terminals of potentiometer 60 are also directed to the interface box 38. Hence as can be seen from FIG. 2, the exercise bicycle produces five separate outputs which can be directed to any suitable paddle inputs of a video game. For example, a particular game as the Atari 400 will have eight paddle inputs and sixteen switch inputs and these can vary from one manufacturer to another with the exception that all present games will accommodate the five inputs provided by the exercise bicycle. The five inputs are the output pulses developed by generator 34, the two outputs generated by the switches 42 and 43 and the two outputs generated by potentiometers 60 and 43. These outputs can be utilized as described in FIG. 1 to control the vertical and horizontal motion of the object being moved by the video game as manifested by the video display. The output from the generator may be employed to control the speed of object motion while two buttons are used to fire or perform other functions associated with the video game.

The values of the potentiometers are typically 1 Megohm. This is a typical resistance requirement for most video games, and the value of the potentiometer can be varied from a relatively low impedance to the relatively high impedance of 1 Megohm.

Figure 6:
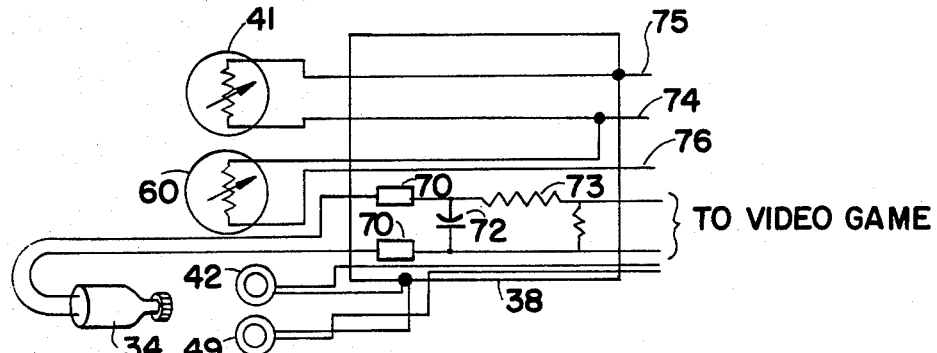
FIG. 6 is a simplified schematic view of an interface box employed in this invention.

Referring to FIG. 6, there is shown a simple schematic diagram of the interface box 38. Essentially, the output leads from the generator 34 are directed to an integrating circuit containing diodes 70 and 71 which diodes have their anodes or cathodes connected to a capacitor 72 with a resistor network 73. Essentially, the diodes and capacitor operate as an integrating circuit to convert the pulses from generator 34 to a DC voltage which voltage is applied to the appropriate input terminals of the video game to enable speed control of the game. The outputs of each potentiometer as 43 and 60 are directed to the box which connects two of the terminals to a common lead 74 which is a ground lead with separate output cables as 75 and 76 being coupled directly to the paddle inputs of the video game.

One lead of each switch as 42 and 49 is connected via the interface box to the common ground lead while the other outputs of the switches are directed to the switch inputs of the video game. In this manner, the various controls above described can enable the user to operate the game by pedaling the bicycle thereby moving the handlebars to the left and right or up and down to control vertical and horizontal motion of the display as well as the magnitude of such motion. It should be understood from the above description that the exercise bicycle in conjunction with the apparatus described enables a user to receive a great deal of exercise while fully enjoying the excitement provided by the video game. Hence this apparatus is particularly useful in providing indoor exercise and in making video game playing a more healthful event.

Figure 7:
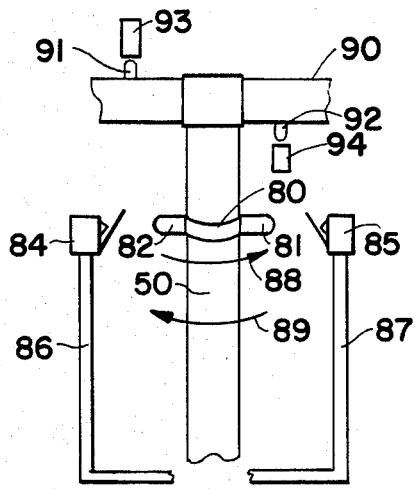
FIG. 7 is a simplified diagrammatic view of a switch controlled exercise bicycle according to this invention.

Referring to FIG. 7, there is shown a partial view of a bicycle stem such as stem 50 of FIG. 2. Essentially, in many video game operations, one merely requires switch inputs to activate the game as to move the character or object from left to right or up or down. In FIG. 7 a clamp assembly 80 has two extending tabs 81 and 82. Positioned on the left and right are two microswitches 84 and 85 which switches are secured to the non-moveable portion of the bicycle by means of suitable brackets 86 and 87. As one can see, as the stem 50 is turned, the tabs as 82 and 81 will close the switches. Thus switch 82 will be closed for a turn of the stem in the direction of arrow 88 while switch 85 will be closed or activated by the turn of the stem in the direction arrow 89. In this manner, the switch inputs can move the objects on the video display to the left or right again under control of the user of the exercise bicycle.

In a similar manner the handlebar assembly 90 shown in partial view is associated with suitable extending tabs 91 and 92 which will activate corresponding microswitches 93 and 94. As the handlebars are tilted up or down to thereby control vertical or horizontal motion of the display by means of the bicycle. As seen in FIG. 7, tab 91 will activate switch 93 when the handlebars are moved or tilted upward or towards the user while tab 92 will activate switch 94 when the handlebars move upwardly or are tilted away from the user.

Figure 8:
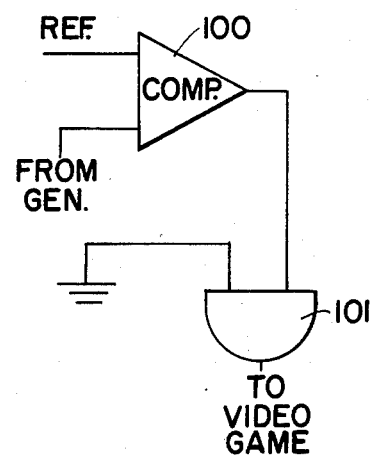
FIG. 8 is a simple electrical schematic view of a circuit used to activate a video game according to the speed at which the operator pedals.
Figure 3:
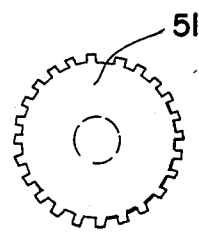
FIG. 3 is a top plan view of a gear knob utilized in this invention.

In such systems, the output of the generator is converted to a DC voltage by means of an integrated circuit as shown in FIG. 3. This output is applied to one input of a comparator circuit 100 as shown in FIG. 8. The other input from the comparator is coupled to a reference voltage which may be derived from a battery or similar source. The output of the comparator is directed to one input of an AND gate 101 having its other input connected to ground or a reference potential. The output of AND gate 101 is directed to the ground input of the video game. In all of such games, one will not be able to operate the game unless there is a ground at the ground terminal.

In FIG. 8, if the operator of the bicycle does not produce a voltage greater than the reference voltage than the comparator 100 will not produce an output to energize gate 101. Thus, if this is not accomplished, then the switches, for example, as shown in FIG. 7 will not operate to do anything to the display. If, however, the operator pedals the bicycle rapidly enough, then he will exceed the reference voltage and ground will be supplied to the video game which will then respond to the openings and closures of the switches. This ground feature also exists in most video games and according to the program format. It should be discerned from the above description that there are a host of alternative devices available all of which can operate with suitable mechanical means associated with an exercise bicycle. Accordingly, the user of such a bicycle can now receive enjoyment in playing the game and exercise at the same time.

It is, of course, understood that each video game that is available on the market such as the ones indicated have paddle inputs as well as switch inputs to enable accommodation of the above described device to operate the game according to the program format. Apart from the obvious healthful benefits derived from the apparatus, it is apparent that many different programs can be devised and developed which utilize the exercise bicycle and the apparatus described above to implement even more interesting and challenging programs.

As alluded to, most exercise bicycles do not have movable handlebars but essentially, the handlebar is coupled to the stem by means of a clamp and a bolt. If the bolt is loosened, then the handlebars can be moved up and down or tilted, and if the stem is modified, the handlebars can be turned side to side. There are many ways of accomplishing this all of which are relatively apparent to those skilled in the art. It is, of course, an important aspect of this invention that such operational movement of the handlebars be accommodated.

Therefore, many modifications will be apparent to those skilled in the art as for example utilizing another type of speed detector such as a reed switch or other device to replace the electric generator.

I claim:

1. An exercising apparatus for controlling a video game apparatus, said game of the type having input terminals for receiving electrical type signals necessary to control the movement of a particular object associated with a video game as displayed on the screen of a television receiver associated with said video game apparatus, comprising in combination therewith,
    an exercise bicycle having a frame and having a pedal driven wheel and a moveable handlebar assembly which assembly is pivotally coupled to said frame to move in a right or left direction as well as move up or down,
    first means coupled to said handlebar assembly to provide a first output signal indicative of the extent of motion of said assembly in said right or left direction to provide control of the movement of said object in the horizontal plane,
    Second means coupled to said handlebar assembly to provide a second output signal indicative of the extent of motion of said assembly in said up or down direction to provide control of the movement of said object in the vertical plane,
    third means coupled to said wheel to provide a third output signal indicative of the speed of the wheel to provide control of the speed of said object as moving in said horizontal or vertical planes, and
    means adapted to apply said first, second and third output signals to associated input terminals of said video game apparatus whereby said object can be controlled to move about said screen according to said output signals.

2. The exercising apparatus according to claim 1, wherein said first means includes a potentiometer having a rotatable shaft, gear means coupled to said shaft, a gear strip coupled to said handlebar assembly and coacting with said gear means to move said shaft and hence vary the resistance of said potentiometer accordingly said potentiometer having at least one output terminal coupled to one input terminal of said video game apparatus.

3. The exercising apparatus according to claim 1, wherein said second means includes a potentiometer having a rotatable shaft, gear means coupled to said shaft, a gear strip coupled to said handlebar assembly and coacting with said gear means to move said shaft and hence vary the resistance of said potentiometer accordingly said potentiometer having at least one output terminal coupled to one input terminal of said video game apparatus.

4. The exercising apparatus according to claim 1, further including a first and a second momentary switch with said first switch mounted on said handlebar assembly near the right handlebar, with said second switch mounted on said handlebar assembly near the left handlebar, each of said switches capable of operating in a first state when depressed each switch having at least one output terminal, with each of said output terminals coupled to an associated input terminal of said video game apparatus.

5. The exercising apparatus according to claim 1, wherein said third means includes an electrical generator of the type capable of providing at an output terminal a repetitive signal according to the speed of rotation of the generator shaft; with said shaft coacting with the sidewall of said wheel, and converter means coupled to said output terminal for providing a DC signal for application of said signal to said video game apparatus.

6. The exercising apparatus according to claim 5, wherein said converter means is an integrating network including a filter capacitor and a rectifier for developing said DC signal.

7. The exercising apparatus according to claim 1, wherein said first means includes a first momentary operated switch positioned on the right of said handlebar assembly and a second momentary switch positioned on the left of said handlebar assembly, extending tab members coupled to said handlebar assembly and operative to move as said assembly is moved to actuate said right or left switch for a right or left movement of a given distance.

8. The exercising apparatus according to claim 1, wherein said second means includes a first momentary switch positioned above said handlebar assembly and a second momentary switch positioned below said handlebar assembly, said handlebar assembly including corresponding extending tabs positioned to coact with and operate said switches for movement of said handlebar assembly at given distance in said up or down direction.

9. The exercising apparatus according to claim 1, further including comparator means having one input responsive to said third output signal and having another input coupled to a predetermined level for providing at an output a signal indicative of said third signal exceeding said level, with the output of said comparator adapted to be applied to an associated terminal of said video game, whereby if said wheel is not rotating at a proper speed said game will not operate.

* * * * *